US006941154B1

(12) United States Patent
Ritter

(10) Patent No.: US 6,941,154 B1
(45) Date of Patent: Sep. 6, 2005

(54) TELECOMMUNICATION METHOD

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/582,945

(22) PCT Filed: Jan. 6, 1999

(86) PCT No.: PCT/CH99/00006

§ 371 (c)(1), (2), (4) Date: Jul. 7, 2000

(87) PCT Pub. No.: WO99/35771

PCT Pub. Date: Jul. 15, 1999

(30) Foreign Application Priority Data

Jan. 9, 1998 (CH) .............................................. 0024/98

(51) Int. Cl.[7] .................................................. H04M 1/00

(52) U.S. Cl. ................................ 455/550.1; 455/556.1; 455/412.1; 455/414.1; 455/466; 725/62; 725/99

(58) Field of Search .............................. 455/550.1, 412, 455/414, 74, 466, 556, 557, 3.01–3.06; 725/62, 87, 92, 99, 106

(56) References Cited

U.S. PATENT DOCUMENTS

| | | | | |
|---|---|---|---|---|
| 5,173,589 A | * | 12/1992 | Diehl et al. | 235/375 |
| 5,226,177 A | * | 7/1993 | Nickerson | 340/10.41 |
| 5,257,099 A | * | 10/1993 | Morales-Garza | 455/13.1 |
| D356,079 S | * | 3/1995 | Oba | D14/126 |
| 5,438,355 A | * | 8/1995 | Palmer | 725/110 |
| 5,444,769 A | * | 8/1995 | Koen et al. | 379/94 |
| 5,500,681 A | * | 3/1996 | Jones | 348/473 |
| 5,594,779 A | * | 1/1997 | Goodman | 455/3.04 |
| 5,613,190 A | * | 3/1997 | Hylton | 725/81 |
| 5,684,526 A | * | 11/1997 | Yoshinobu | 348/734 |
| 5,852,610 A | * | 12/1998 | Olaniyan | 370/486 |
| 5,946,026 A | * | 8/1999 | Suzuki | 725/122 |
| 6,014,569 A | * | 1/2000 | Bottum | 455/466 |
| 6,138,002 A | * | 10/2000 | Alperovich et al. | 455/407 |
| 6,142,369 A | * | 11/2000 | Jonstromer | 235/379 |
| 6,212,359 B1 | * | 4/2001 | Knox | 725/135 |

FOREIGN PATENT DOCUMENTS

| | | |
|---|---|---|
| EP | 0 426 542 | 5/1991 |
| EP | 0 689 368 | 12/1995 |
| WO | WO 95/15654 | 6/1995 |
| WO | WO 97/40616 | 10/1997 |

* cited by examiner

*Primary Examiner*—William Trost
*Assistant Examiner*—Stephen D'Agosta
(74) *Attorney, Agent, or Firm*—Oblon, Spivak, McClelland, Maier & Neustadt, P.C.

(57) ABSTRACT

A telecommunication method and a receiving apparatus for enabling the telecommunication method. A telecommunications mobile device comprises an identification card, a radio receiver, and/or a television receiver, wherein the identification card is capable of identifying the user of the telecommunications mobile device. When the telecommunications mobile device receives digital data, transmitted over a broadcast channel as program-accompanying data in a media program, it displays information, corresponding to the received digital data, on a display of the telecommunications mobile device and allows the user to enter a command. Based on the entered command, a message is prepared that includes at least one data field from the received digital data as well as an identification of the user determined from the identification card. The prepared message is then sent over a mobile radio network.

16 Claims, 4 Drawing Sheets

TELECOMMUNICATION METHOD

The present invention relates to a telecommunication method and to a receiving system for carrying out this method. The invention relates in particular to a telecommunication method which can be utilized on a broadcast channel.

The most widespread broadcast systems are purely monodirectional and therefore have no backward channel by means of which the receiver could send response messages to the sender. That is the case, for example, in most radio and TV broadcast systems. If the receiver, e.g. the radio listener or the television viewer, would like to react to a program or to a commercial, he must therefore have recourse to some other telecommunications system, e.g. his telephone. If, for example, a product is advertised on television, the interested customer must immediately make a note of the address or telephone number of the supplier and call him later manually. The customer must then identify himself to the supplier and indicate by telephone the product which interests him. This procedure is extremely complicated and error-prone. For this reason, most broadcast systems are not entirely suitable for prompting the receiver to make spontaneous purchases during or just after a commercial. Moreover, it is difficult to design TV or radio programs in which immediate feedback from the receiver is needed.

Adding accompanying digital data to a radio or television program is likewise already known. In television systems, digital data can thus be transmitted during the vertical raster interval. An appropriate hardware and software device in the receiver's television set or PC makes it possible to decode these digital data, to select them, and to store them or display them on the receiver's screen. In radio systems, the transmission of program-accompanying data in addition to the radio programs is used above all with digital radio systems of the DAB (digital audio broadcasting) type. DAB technology makes it possible in this way to transmit both radio programs and accompanying services (program associated data, PAD). DAB receivers containing a data decoder and a respective display are commercially available. TV program channel, this channel for program-accompanying data is only monodirectional.

Broadcast channels having a backward channel whereby digital data are sent between a server and a number of receivers, e.g. by means of a push channel on the Internet, have meanwhile also become known. According to the user's choice and interests, these digital data can then be stored and/or filtered in the user's receiving system. For example, a complete information program can be transmitted to the user, who then decides, for instance, to display or store only the information pertaining to sports articles or politics. With these systems, the receivers can receive a program passively and respond only when, for example, they want more information on a subject or when they want to order a product. As is well known, however, it is difficult to identify users reliably on the Internet, so that this method is not entirely suitable for transmitting confidential or security-sensitive data, such as product or remittance orders, to the sender or to a supplier. Furthermore, the user must have a minimum knowledge of computer technology in order to take advantage of an offer transmitted through a push-channel in the media program. For instance, the user must compose an E-mail message containing his own identification, a description of the product to be ordered, and the identification of the chosen supplier. Hence this method is rather lengthy and troublesome. Moreover, possible errors made by the user or arising through problems with the transmission in the telecommunications network are not easy to locate. The result is a substantial percentage of orders which cannot be carried out because, for instance, the particulars from the user have been entered incompletely or erroneously.

Described in the patent application EP 426 542 A1 is a method for direct marketing via a television network as well as a device for carrying out the method. According to the teaching disclosed in EP 426 542 A1, television receivers are equipped with chip-card readers, and information received from a sender, which contains product identication, is processed in a chip-card inserted into the chip-card reader, information received and user authentification data stored on the chip-card being processed together, and the result of this processing is displayed on the television screen when the television viewer enters a command. To order a product, the television viewer can communicate the said result to the sender in a delayed way, for example by means of post or telephone, or immediately, for example via a cable network, according to the teaching disclosed in EP 426 542 A1.

It is therefore the object of the present invention to provide a telecommunications system which avoids the above-mentioned drawbacks.

This object is attained, according to the invention, by means of a method and a system having the features of the respective independent claims, preferred embodiments being presented moreover in the dependent claims.

By means of the inventive system and method, the receiver can automatically compose and transmit messages not only to the sender, but also to other partners, e.g. to suppliers of advertised products.

The invention will be better understood with the aid of the description, given by way of example and illustrated by the figures, whereby:

FIG. 1 shows schematically the system components which can be utilized for carrying out the inventive method. The individual elements will now be described in detail:

Figure 1:
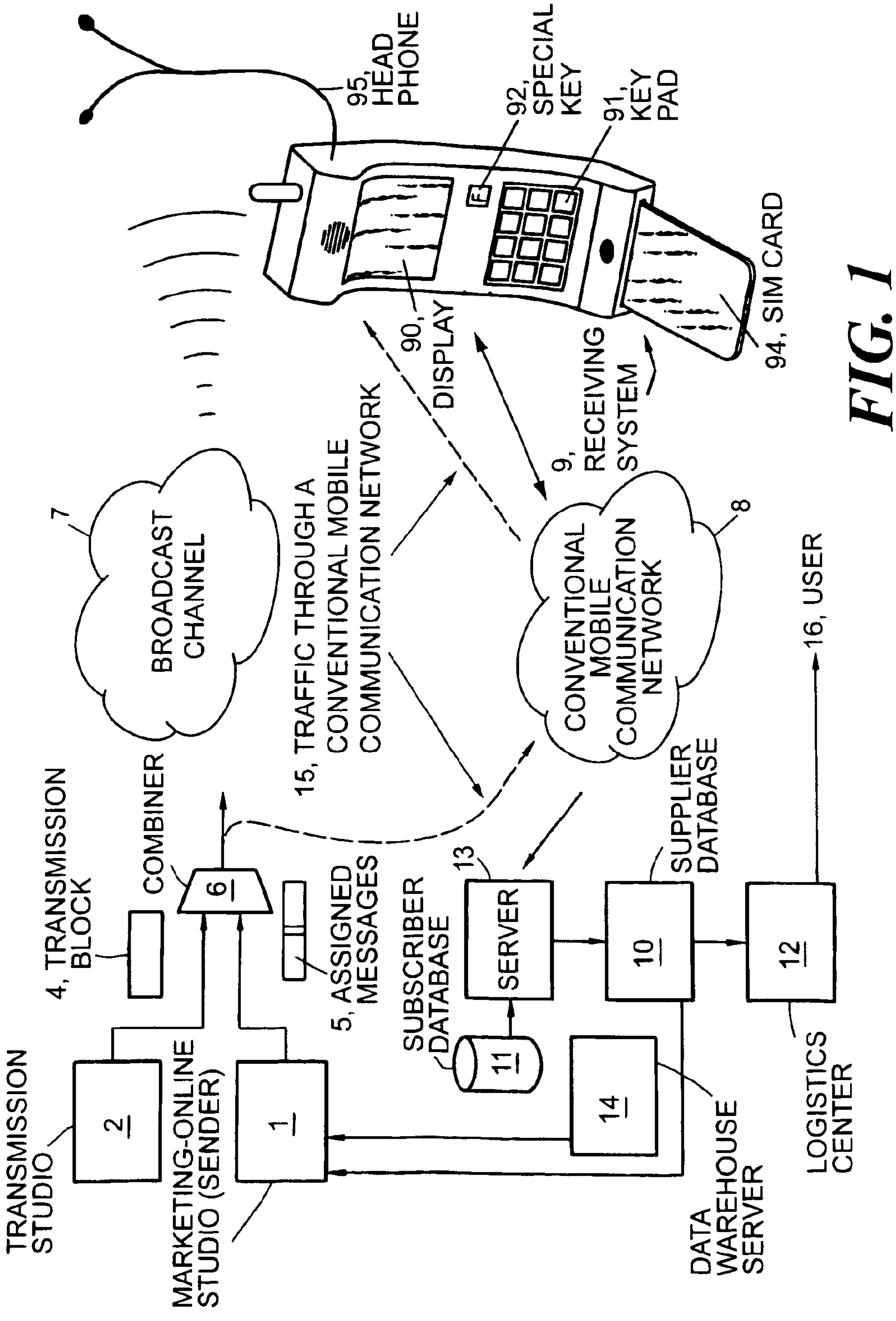
FIG. 1 shows a schematic view of the system according to the invention.

Reference numeral 1 represents a marketing-on-line studio. Here individual order numbers 52 are prepared, packed with Java applets 50 (Java is a registered trademark of Sun Microsystems), and assigned to one or more transmission blocks. These messages will be explained below with reference to FIG. 2.

In a transmission studio 2, media programs are prepared and divided into transmission blocks. A transmission block may, for instance, correspond to an advertisement, a piece of music, a radio play, a commercial, a film, a Web site, etc. The transmission studio may, for example, be a radio studio, a TV studio, or an Internet server.

Transmitted transmission blocks 4 are combined at 6 with assigned messages 5 and sent out over a broadcast channel 7. Depending upon the application, broadcast channel 7 may, for example, be an FM broadcasting network, a TV broadcasting network, or an Internet push channel. Alternatively, the transmission blocks 4, e.g. advertising messages, and the respective messages 5 may also be sent out over a conventional mobile communication network 8, as indicated by arrow 15.

The transmitted media program is received by a receiving system 9 according to the present invention. The receiving system 9 may, for example, be a mobile telecommunications device having an integrated radio receiver. With this system, the user may telephone quite conventionally over a mobile radio network 8, e.g. a GSM network, or use it as a conventional FM receiver instead, e.g. to listen to radio programs by means of headphones 95. In a modification, the receiving system has a television receiver instead of or in addition to the radio receiver for viewing television programs on a display 90 of the mobile apparatus. Mobile radio apparatus provided with an adequate screen, e.g. for video telephone applications, are commercially available; one skilled in the art can easily integrate a TV tuner in such a mobile videophone apparatus so that television can also be viewed with this system. The mobile radio functions and the radio or TV functions can be operated individually or in combination. In the case of individual operation, the radio or TV receiver can be operated like a conventional individual apparatus. In the case of combined operation, the FM radio or TV receiver is operative, and the mobile radio component is on standby or in communication mode. By means of a special key 92, the user, upon receiving an interesting message, can activate the execution of the applet 5 and the screen display shown in FIG. 3.

The receiving system 9 may also consist of a radio and/or TV receiver with additional mobile radio communication components integrated in the housing. It is equally possible to integrate the mobile radio components in a remote control for a television set or for some other broadcast receiver. Furthermore, the receiving system may also consist of a computer, e.g. a PC or a palmtop, with integrated reception means for radio, TV, and/or Internet, as well as communication means for a mobile radio network 8. As will be explained below, however, the inventive method can also be carried out with a conventional mobile radio device 9, e.g. a GSM terminal.

The receiving system 9 preferably contains in addition means known per se for sending and receiving SMS (short message system) and/or USSD (unstructured supplementary service data) short messages, as well as filter means known per se for recognizing and temporarily storing special short messages, preferably according to the SICAP method described, among other things, in European Patent No. 0 689 368. Encryption and signature means are preferably present as well in order to decode short messages received and to encode and sign short messages to be sent out. The TTP method may be utilized as an encryption method, for example, or else decryption means functioning according to a point-to-point method.

The receiving system 9 can further transmit a short message having an order number to a server 13 over the mobile radio network 8. The server 13 combines the received order number with user identification data from a subscriber data base 11. These user identification data contain at least the full name and address of the subscriber. The user identification data preferably also contain the user's language, his bank connection and/or credit card company, subscribed services, etc. The subscriber data base 11 is preferably the data base of the operator of the telecommunications network 8 for administering the subscribers. Its contents are therefore extremely reliable in principle. It may also contain a temporary address of the subscriber. In a modification, the subscriber data base contains the user identification data only of users who have subscribed to the inventive system.

The receiving system 9 contains user identification means, preferably chip-card reading means, for identifying the user of the receiving system by means of an identification card. Such chip-card reading means are customary, among other things, in GSM mobile apparatus provided with SIM (subscriber identification module) cards. However, other identification cards, e.g. cards known by the name of OpenCard, may also be used, depending upon the receiving system.

The server 13 then combines at least some of the information contained in the short message entered by the user with the user identifications in order to complete the identification of the user not fully transmitted.

The server 13 is connected to a product/information supplier data base 10. It is via this data base that the functions of the system are controlled. It preferably newly contains a user profile. The data combined in the server 13 are sent by means of this data base to the logistics center 12 of the respective supplier, who then delivers the ordered products or information to the user 16.

A data warehouse server 14 analyzes the messages received from the user 9 <sic. 16> and hence draws up user profiles which allow marketing at the point-to-point level. The users may then load a user profile or a group of offered profiles on their identification card 94 so that they can also be directly addressed in the broadcast process.

The user may also order a profile for himself and have it assigned to him, e.g. by means of a special order message or on line by means of a computer.

The process which takes place in the elements 9 to 14 is described in more detail in the patent application PCT/CH96/00464, the contents of which are incorporated here.

Figure 2:
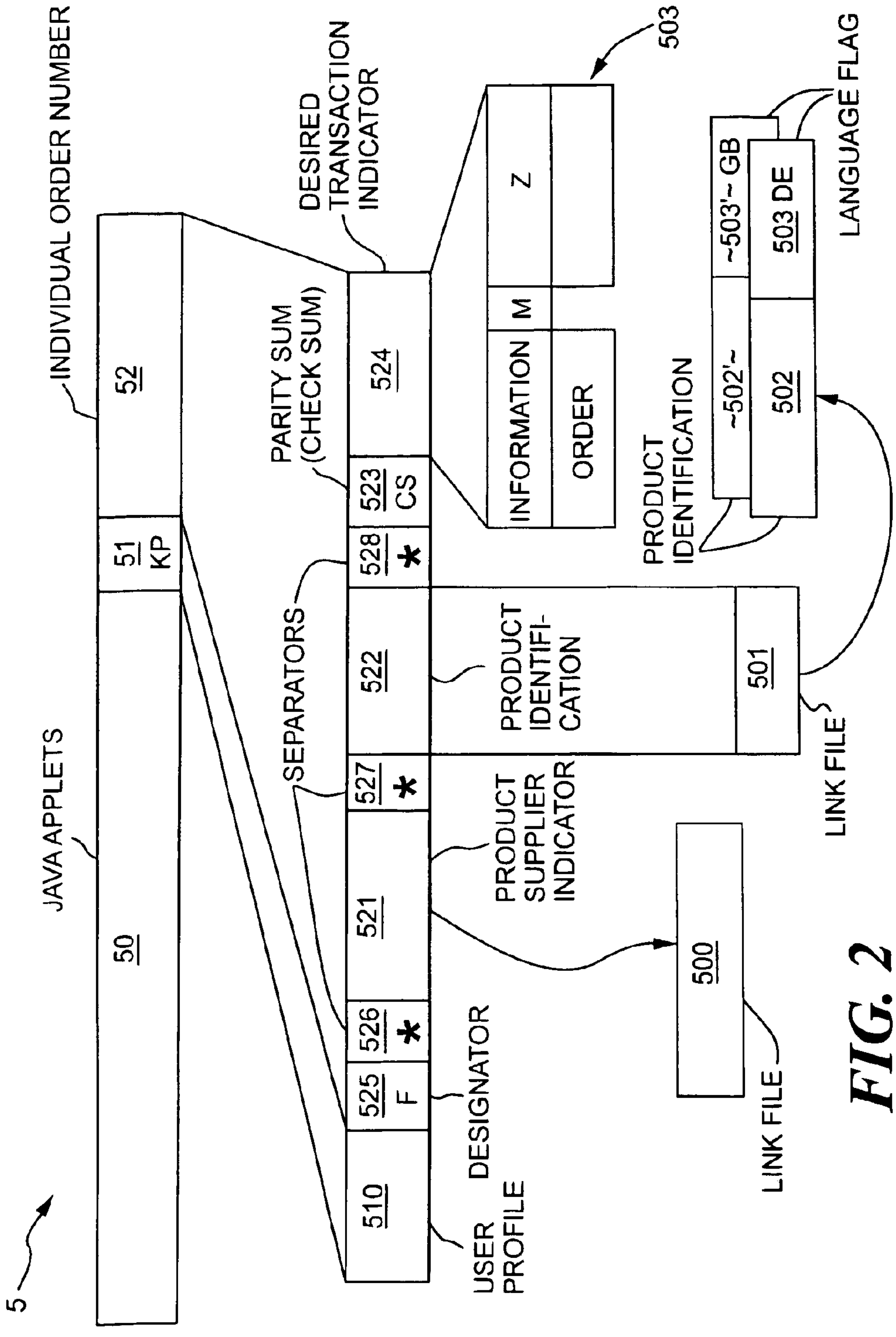
FIG. 2 shows a schematic view of the structure of the order code transmitted.

FIG. 2 shows the structure of the message 5. The order number 52 itself is packed together with the respective Java code 50. This Java applet is received by the SIM card 94 in the mobile apparatus 9, having Java capability, which consequently carries out an interactive process with the user. The Java code 50 is transmitted only between the sender 1 and the mobile apparatus so that this interactive process takes place between the SIM card 9 <sic. 94> having Java capability and the user, but not between the mobile apparatus 9 and the server 13. Instead of Java, the applets may naturally also be written in some other object-oriented computer language.

The message 5 further comprises a user profile 510 drawn up in the studio 1, by means of which profile the data of interest to the user are filtered in the SIM card 94. For example, when the invention is utilized for securities trading, the user profile may, for instance, correspond to a segment of securities in an automatic trading system. The data-processing means in the SIM card 9 <sic. 94> can then automatically prepare a short message for the server 13 if buying or selling signals occur. The user then has the option of carrying out a respective process.

The user profile may be drawn up in the data warehouse 14 by the user himself or by combination. By means of a personal user profile, it becomes possible to indicate to a user the specific products in which he is really interested.

For example, the user may send a short message asking the logistics center 12 for a list of profiles and detail segments, which is displayed on his screen 90. Alternatively, a user profile may also be ordered on line with a PC or other computer. The user profile ordered is, for instance, stored in a user profile table in the secured area of the SIM card 94 and is used for selecting applets containing the information of interest. The user profile table can preferably not be modified by the user directly via the mobile apparatus.

Field 525 contains only a designator F for the order number 52. Fields 526, 527, and 528 contain separators. Field 521 contains a product supplier indication for the product or information offered. This designator preferably consists of a predefined abbreviation of the supplier's name. In order for the user to be able to understand this abbreviation, the supplier's full name is preferably transmitted as well as a link file (500) in the applet 50.

Field 522 contains the product identification, e.g. a product number. The product offered preferably corresponds to the transmission block 4 sent out simultaneously. For instance, if a piece of music is broadcast on the FM channel, various products pertaining to that piece of music may be offered simultaneously on the data channel or on DAB as an option in a menu, e.g. for ordering a CD, or sheet music, or tickets to a concert, etc. This mechanism controlled by the studio 1 may also be designed dynamically.

In addition to the product number 522, a link file 501 to one or more product identifications 502, 502', etc. in plain text and in several languages is preferably transmitted in the applet 50 and, if need be, displayed on the screen 90. The product identification is preferably provided with a language flag 503, 503', etc. This makes it possible for the product name to be set to the user's language by means of the language flag on the user-specific Java SIM card.

Field 523 (CS) contains a check sum or a parity sum in order to catch any errors in field 52. If such an error occurs at the level of the server 13, the user is prompted to repeat his entry.

The check sum is established by means of any known error-checking or error-correction algorithm from field 521 and 522. For example, a parity-check algorithm may be used for establishing the value of the check sum 523. The number of characters in the check sum depends upon the algorithm used and on the maximum accepted error quota.

Finally, field 524 contains an indication concerning the desired transaction. This process can be controlled interactively by the user to enter whether he would like to order a product (ORDER) or whether he would just like to ask for information, for instance. If the receiving system is also linked to the Internet, a code W may also be entered in order to set the apparatus directly to a corresponding Web page. By means of a terminal identification IMEI in the receiving system, the Java applet can recognize whether the system has access to the Internet and whether the W option code must also be offered.

Furthermore, by means of options in field 524, the desired product quantity (M) and the preferred mode of payment (Z) can be selected.

This division of information in the short-message order is given only by way of example, for other ways of dividing it are quite conceivable. Moreover, the various data fields may be mixed, encrypted, and/or signed in order to guarantee confidentiality. The information may also be divided up into different short messages sent in succession.

Figure 3:
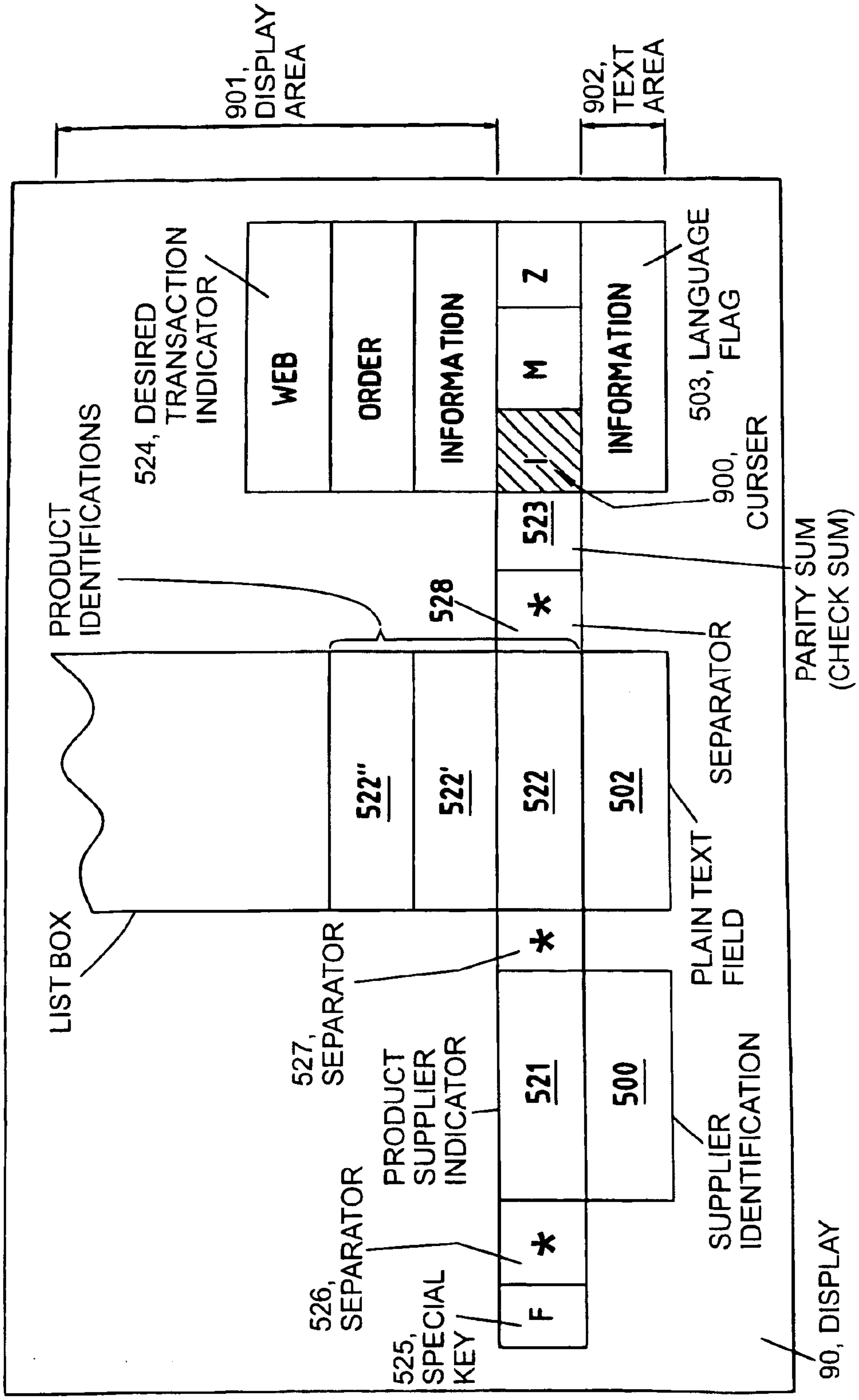
FIG. 3 shows a screen view generated on the display of the user's receiving system by the inventive Java applet.

FIG. 3 shows diagrammatically the screen 90 during execution of a message which has passed through the filter. In this example, the whole order number 52 is interactively depicted. Under the abbreviated supplier designator 521, the full supplier identification 500 is displayed. Using a cursor 900, the user can choose one of a number of products 522, 522', 522", . . . in a list box in area 901. The name of the chosen product is permanently shown in plain text in field 502. Similarly, the Java applet permits selection of the transaction possibilities (order or information), the desired quantity (M), and the mode of payment (Z) by means of a menu, the chosen option always being explained in plain text in the text area 902 of the screen.

The sequence of operations will now be described in detail. In the case of a mobile apparatus combined with a radio receiver, advertising programs, music, news, etc., are sent out on the broadcast channel 7. At the same time, the order number 52, preferably packed with applet 50, is also sent out on the available data channel. If an offer or a piece of music appeals to the user, he can press the F-key 92 in order to activate the execution of the applet and the screen display of FIG. 3. With the cursor, the user can then pick out an operation, e.g. from the list boxes, and in this way enter a command; depending upon the supplier, only a single option, e.g. a single product which can be ordered, may be displayed instead.

If the user selects a transaction code which does not relate just to information, an interactive process preferably follows so that the user's authenticity can be ensured. This process may take place directly on the card 94, e.g. by means of UP (trusted third party) or PTP (point-to-point) resources on the card, or interactively in a security server (not shown).

In the case of a mobile apparatus combined with a television receiver or a multifunctional computer, the sequence of operations is analogous. In that case, however, the receiving system may also be linked to the Internet and display Web pages. The system may thereby be set directly to the respective Web page.

The inventive method may also be used with ordinary mobile apparatus which do not contain any additional broadcast channel receivers, as already indicated by arrow 15 in FIG. 1. In that case, messages are sent out from a central office 2 to several or all users over the normal mobile radio network 8 in the broadcast method. In this modification, it is advisable to work with user profiles so that the information reaches only those users who are interested in it or those who have subscribed to a respective service.

Figure 4:
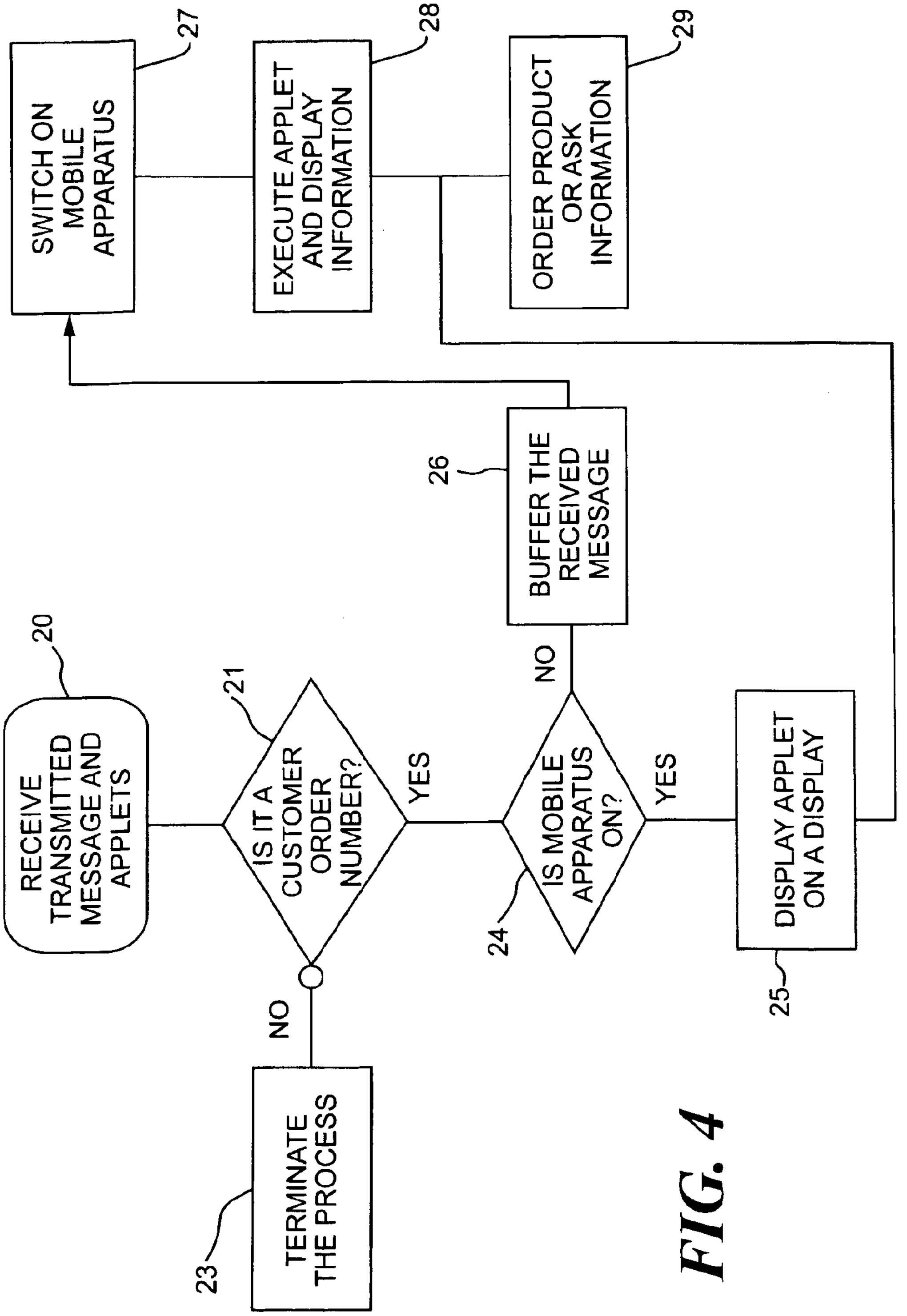
FIG. 4 is a flow chart indicating the various steps carried out upon reception of such an applet in the receiving system.

The method implemented in the receiving system 9 upon receipt of a message 5 will now be described with reference to FIG. 4.

The receiving system has receiving means for receiving a media program sent out over a broadcast channel and program-accompanying data, and reproduction means for playing the received media program back to the user. The receiving system can thereby receive transmitted messages 5 and applets 50 as program-accompanying data (step 20).

The messages 5 received are then evaluated, this evaluation taking place even when the mobile radio part of the receiving system is switched off or in standby mode. If a message with an order number 52 is received (designated by the designator 525), the user profile is evaluated (test 21). If the order number received does not correspond to any customer profile, the process is terminated (step 23); otherwise, this code is further processed. If the mobile apparatus is switched on (test 24), the applet 50 is directly displayed on the display 90 (step 25). The user may then, for example, order products or ask for information, as described above (step 29).

If, on the contrary, the mobile apparatus is switched off, the message 5 received or just the applet 50 is filed in a buffer (not shown) on the SIM card 94 or in the receiving system 9 (step 26). Only later, when the mobile apparatus is switched on (27), is the applet 50 executed and the information displayed (step 28), so that the user may order products or ask for information (step 29).

What is claimed is:

1. A telecommunication method, comprising:

receiving, by a telecommunications mobile device containing a radio receiver and/or a television receiver therein, digital data, transmitted over a broadcast channel as program-accompanying data in a media program, wherein the telecommunications mobile device includes an identification card by which a user of the telecommunications mobile device is identified;

reproducing, by the telecommunications mobile device, the media program on the telecommunication mobile device;

displaying information, corresponding to the received digital data, on the telecommunications mobile device;

entering a command by the user;

preparing a message corresponding to the entered command, the prepared message including at least one data field from the received digital data and an identification of the user determined from the identification card; and sending the prepared message over a mobile radio network, wherein the received digital data is temporarily stored in a buffer when components needed for processing the digital data are switched off and is not processed until the components are switched on, and the information that is not of interest to the user is sorted out based on a user profile stored in the memory of the telecommunications mobile device.

2. The telecommunication method in accordance with claim 1, wherein the displayed information contains at least one menu from which a command can be selected.

3. The telecommunication method in accordance with claim 1, wherein the digital data contains applets which are executed by the telecommunications mobile device.

4. The telecommunication method in accordance with claim 1, wherein the received digital data is packed in messages which are first evaluated in order to determine whether the messages are to be displayed.

5. The telecommunication method in accordance with claim 1, wherein the digital data is transmitted in a radio channel.

6. The telecommunication method in accordance with claim 1, wherein the digital data is transmitted in a TV channel.

7. The telecommunication method in accordance with claim 1, wherein the prepared message is a SMS message.

8. The telecommunication method in accordance with claim 1, wherein the prepared message is a USSD message.

9. The telecommunication method in accordance with claim 1, wherein the prepared message is signed.

10. The telecommunication method in accordance with claim 1, wherein the prepared message is encrypted.

11. A telecommunications mobile device comprising mobile radio components, through which the telecommunications mobile device is operative in a mobile radio network, the telecommunications mobile device including an identification card that is capable of identifying the user of the telecommunications mobile device, wherein the telecommunications mobile device further comprises:

a radio receiver and/or a television receiver for receiving a media program, transmitted over a broadcast channel, and program accompanying data;

reproducing means for playing back to the user the media program received; and message-preparing means for preparing and sending, over the mobile radio network, messages that include at least one data field from the program-accompanying data and an identification of the user, wherein the received digital data is temporarily stored in a buffer when components needed for processing the digital data are switched off and is not processed until the components are switched on, and the information that is not of interest to the user is sorted out based on a user profile stored in the memory of the telecommunications mobile device.

12. The telecommunications mobile device in accordance with claim 11, wherein the mobile radio components include a GSM mobile device.

13. The telecommunications mobile device in accordance with claim 12, wherein the identification card is a SIM card capable of executing applets transmitted in the program-accompanying data.

14. The telecommunications mobile device in accordance with claim 12, wherein the message-preparing means are capable of preparing and sending SMS messages.

15. The telecommunications mobile device in accordance with claim 12, wherein the message-preparing means are capable of preparing and sending USSD messages.

16. The telecommunications mobile device in accordance with claim 12, further comprising a key for causing information, corresponding to the digital data received, to be displayed on a display of the telecommunications mobile device.

* * * * *